United States Patent [19]

Ziehm, Jr.

[11] 4,138,293

[45] Feb. 6, 1979

[54] DESALINATION APPARATUS

[76] Inventor: Kurt F. Ziehm, Jr., P.O. Box 13, Land O'Lakes, Wis. 54540

[21] Appl. No.: 872,815

[22] Filed: Jan. 27, 1978

Related U.S. Application Data

[62] Division of Ser. No. 627,964, Nov. 3, 1975, Pat. No. 4,077,849.

[51] Int. Cl.$^2$ .......................... B01D 1/00; B01D 3/00
[52] U.S. Cl. .................................. 202/180; 202/234; 202/205; 203/10; 203/DIG. 1; 203/11; 203/100; 126/271; 165/104 R; 159/1 S
[58] Field of Search ........... 203/10, 11, 100, DIG. 17, 203/DIG. 1, 100 D, 90, 86, 89; 202/234, 236, 180, 177; 165/1, 104 R, 104 M; 126/270, 271; 159/1 S

[56] References Cited

U.S. PATENT DOCUMENTS

| 2,179,080 | 11/1939 | Alther | 203/100 |
|---|---|---|---|
| 2,965,819 | 12/1960 | Rosenbaum | 165/133 |
| 3,170,852 | 2/1965 | Barnhart | 203/100 |
| 3,394,054 | 7/1968 | Hoham | 203/100 |
| 3,442,769 | 5/1969 | Heinz | 203/100 |
| 3,459,638 | 8/1969 | Nagel | 203/100 |
| 3,833,044 | 9/1974 | Wallace | 202/234 |
| 3,908,632 | 9/1975 | Poulsen | 165/104 M |

Primary Examiner—Wilbur L. Bascomb, Jr.
Attorney, Agent, or Firm—Keil & Witherspoon

[57] ABSTRACT

Desalination apparatus utilizing solar heating of metal member(s) such as balls, rollers, or metal endless belt(s) in a heating chamber and vaporizing saline water with the latent heat in said metal member(s) by spraying saline water thereon in a vaporizing chamber, a water-cooled condenser to condense the vapors, a trough to collect the condensate, a rinse tank to remove salt deposits and/or saline water from the metal member(s), and means for returning the rinsed metal member(s) for solar reheating.

6 Claims, 7 Drawing Figures

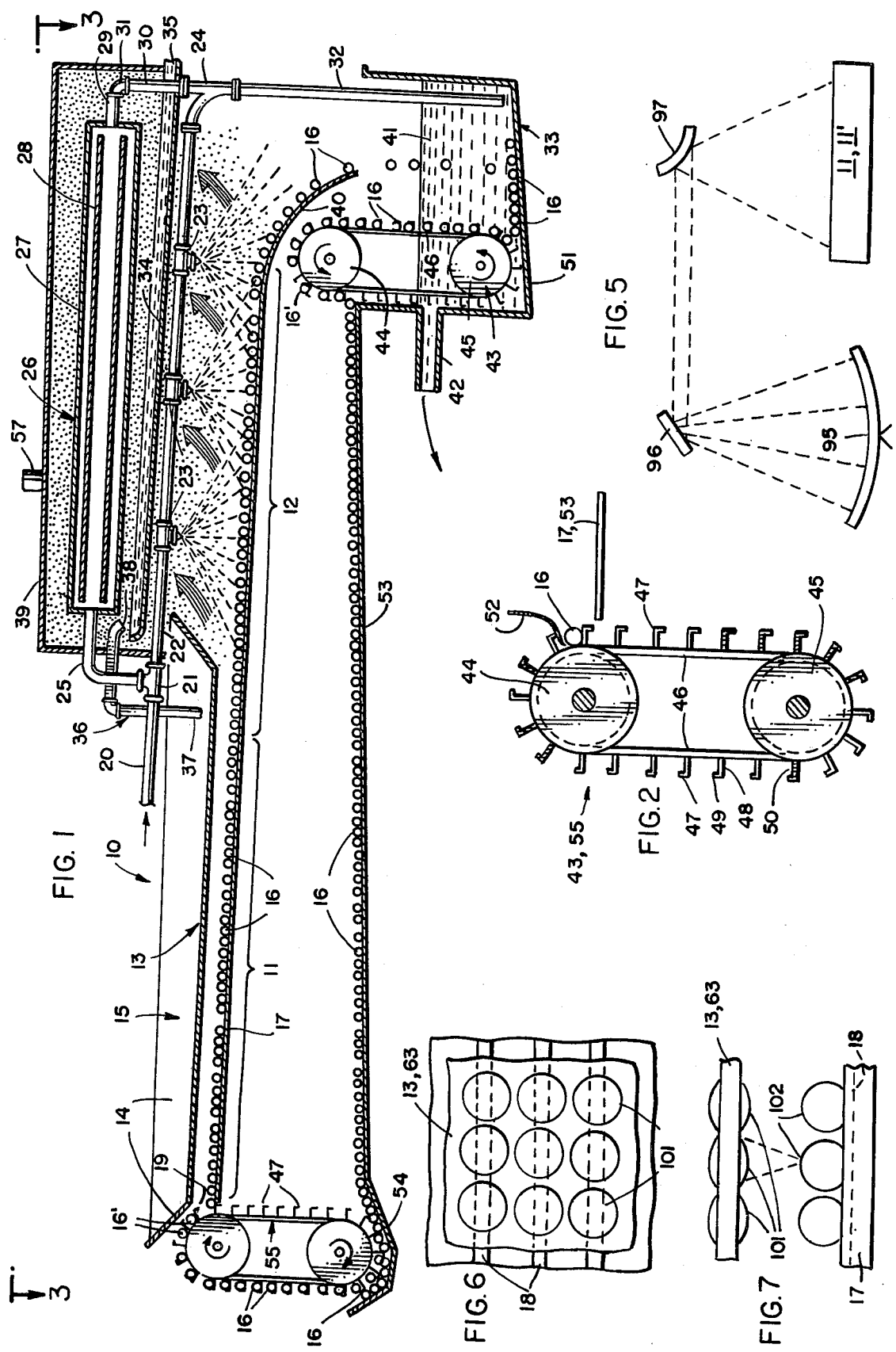

DESALINATION APPARATUS

This is a division of application Ser. No. 627,964 filed Nov. 3, 1975, now U.S. Pat. No. 4,077,849.

This invention pertains to improvements in the desalination of water, particularly sea water or other salt containing water which is non-potable. Such types of waters are readily available on the shores of seas or oceans, gulfs and backwaters thereof and to a lesser extent in arid areas of the world in inland lakes, seas and the like.

The text "Principles of Desalination", edited by K. S. Spiegler, University of California Academic Press, 1966, sets forth various types of solar stills used to obtain potable or desalinated water from salt waters. Such solar stills include inflated plastic sheet solar distillers having insulated tanks under the inflated sheets. Condensate on the sheets runs into distillate troughs in concrete curbs along the periphery of the insulated tank.

Another type of solar still is a multiple ledge, tilted still in which a tilted, shallow, glass-covered box has a stepped series of shallow, narrow, horizontal trays. Salt water is fed to the upper tray and overflows sequentially down the stepped trays. Distillate water condenses on the glass cover and is collected along the lower edge thereof.

Still another type of solar distiller utilizes a rectangular tank with a transparent, gabled cover, through which solar radiation enters the tank and evaporates salt water in the tank. Condensate collected on the gabled cover runs down the cover into troughs or gutters beneath the lower edges of the gabled cover.

The subject invention utilizes a different approach by employment of solar heat-absorbing metal member(s) such as balls, rollers or a metal endless belt to initially absorb solar heat in a heating chamber. The metal member(s) pass beneath a transparent cover and become heated through absorption of the solar radiation passing through the cover. These metal member(s) with their latent heat then pass directly into a vaporizing chamber where they are sprayed with sea water or other salt or saline water. The latent heat therein causes essentially salt-free water to vaporize. The vapors are condensed by a condenser system such as condenser tubes through which pass cooler raw sea water or other readily available fresh and/or saline water. The condensed vapors are collected — thereby providing substantially pure water.

After the metal member(s) pass through the vaporizing chamber they are encrusted with the salts of the sea water or other saline water or coated with relatively high concentrations of aqueous solutions of such salts sprayed thereon and may exit from the vaporizing chamber either wet or dry.

Accordingly, the metal member(s) are immediately rinsed in a rinse tank which preferably is supplied with warm rinse water coming from the condenser tubing. After such rinsing, the rinsed portions of the metal member(s) return to the heating chamber for solar reheating and a repetition of the vaporizing and rinsing functions.

In the case of balls or rollers, the latter are lifted by a lift conveyor out of the warm rinse water and pass by gravity down an inclined track or chute from the rinse tank to the vicinity of the head or entry of the heating chamber. At this point they are again lifted and fed into the solar heating chamber.

If desired, the vaporizing chamber is operated under vacuum. For example, at 15 in. Hg absolute, the equilibrium vapor pressure of water at sea level is 176° F., vs. its normal boiling point of 212° F.

Other features and options of the invention will be explained or made evident from the following description of preferred embodiments of the invention which are illustrated in the drawings:

FIG. 1 is a side elevation, mostly in section, of a desalination apparatus of the character aforedescribed using balls as the solar-heated metal member(s);

FIG. 2 is a side elevation of a ball lift utilized in the embodiment of FIG. 1;

FIG. 5 is a schematic of a solar mirror system; and

FIGS. 6 and 7 are fragmentary top plan views and a fragmentary side elevation of a segment of the heating chamber of FIGS. 1–3 and its glass cover.

Figure 3:
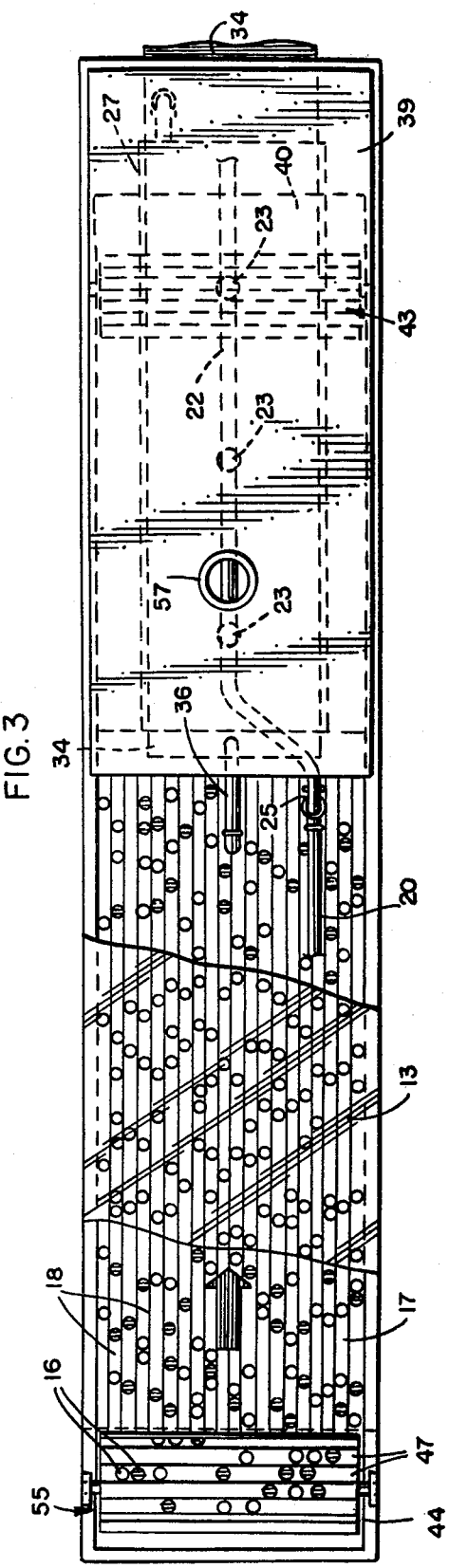
FIG. 3 is a top plan view, partly broken away, of said embodiment.

Referring to the drawings, the embodiment of FIGS. 1–3 utilizes metal balls as the aforesaid metal member(s). It will be appreciated, however, that cylindrical rollers may be used in lieu of the balls as long as the apparatus is designed to keep the rollers oriented so that they will roll down the inclined surfaces of the parts hereinafter described.

Referring first to FIGS. 1 and 3, the solar desalinator 10 comprises a solar heating chamber 11 and a vaporizing chamber 12. The heating chamber 11 is made up of a rectangular in its upper side, the glass of which preferably is of one of the special types hereinafter described. The function of the glass cover is to transmit most efficiently the solar rays to the metal balls or rollers beneath the glass and to retain in said balls or rollers the absorbed solar heat.

Optionally, the glass cover 13 may have around its periphery opaque or transparent sides, e.g., the inclined sides 14, whereby said sides and glass cover form a receptacle for collecting rain water. This rain water is of a substantially pure and/or potable nature and serves as a supplement to the output of desalinated water of the solar desalinator.

The metal balls 16 (or cylindrical rollers) are made of a metal having high heat conductivity. The most preferred metal from an economic viewpoints is auminum. These aluminum balls 16 (or rollers) are anodized black or other dark color to enhance their absorption of the solar radiation.

The metal balls 16 (or rollers) roll along a metal sheet 17 beneath the glass cover 13. The sheet 17 preferably has a slight, longitudinal downward pitch or slope in the direction of the movement of the metal balls to enhance their slow travel through the heating chamber 11 and vaporizing chamber 12. Preferably the upper surface of the sheet 17 has longitudinal grooves or tracks 18 to provide longitudinally parallel paths along the sheet 17 for the metal balls.

The metal balls (or rollers) are fed to the heating chamber 11 at the entrant end 19, move slowly beneath the glass cover 13 and become heated by absorption of the solar radiation. The heated balls (or rollers) then pass directly into the vaporizing chamber 12. This chamber has a pipe 20 for feeding sea water or other saline water to the vaporizing chamber 12. At the T-coupling 21, the feed water branches into pipes 22 and 25. The pipe 22 has a series of spray nozzles 23 and is coupled at its downstream end to a Y-coupling 24. The pipe 25 is connected to a jacket 26 for condensing vapors, the feed water keeping the jacket cool for condensation thereon. The jacket 26 may comprise a shell 27 containing internal baffling or tubing 28 over or through which the cooling water flows inside the jacket. Alternatively, the condenser may simply be a series of convoluted or parallel tubes without an external jacket.

The downstream end of the jacket 26 is connected by pipes 29 and 30 and their intermediary elbow 31 with the Y-coupling 24. In passing through the jacket 26 and the pipe 22, the sea water or other salty or saline water is warmed by heat exchange occurring within the vaporizing chamber 12. This warmed water is fed by pipe 32 to a rinse tank 33, described below.

When the sea water or the like is sprayed from nozzles 23 onto the heated balls (or rollers) passing through the vaporizng chamber 12, all or a substantial portion of the sprayed water is vaporized. The vapors rise as indicated by the arrows in FIG. 1 into the upper portion of the vaporizing chamber. Here the vapors are condensed in the cooler shelf 27 and the condensate drops into a condensate-collecting trough 34 beneath the jacket 26. The condensate trough has a slight pitch so that the substantially pure condensate water 34 flows by gravity out of the vaporizing chamber 12.

Where the heating chamber 11 embodies a rain-water collecting receptacle 15, a tap pipe 36 may be used to convey the collected rain water from the pipe's lower end 37 adjacent the glass cover 13 to its discharge end 38 at the head end of the condensate-collecting trough 34. A mechanical or water pmp (not shown) may be provided on or in the tap pipe 36.

The upper portion of the vaporizng chamber is an enclosed housing 39 which is sealed against loss of vapor contained within the housing. The lower end of the housing 39 may be open, as illustrated, or it may have depending walls, gaskets, etc. to prevent escape of vapors substantially in the manner described below with reference to FIG. 4. The condensatecollecting trough 34 has a width less than the width of the housing 39 so that vapors can pass upwardly around the trough into the upper portion of the housing 39.

The discharge end 40 of the ball-conveying plate 17 has a downward pitch or curvature above the rinse tank 33. The balls (or rollers) fall into the warm sea, salt or saline water 41 in the rinse tank, the water level being maintained constant at the level of the overflow pipe 42, from which the discharge water is returned to the sea, ocean, lake, etc.

The balls 16 (or rollers) have, after passing through the vaporizing chamber 12, solid salt deposits or concentrated salt solutions on their surfaces. The salt deposits and/or concentrated salt solutions are rinsed off in the warm water 41 in the tank 33. The balls 16 (or rollers) are then conveyed by a lift 43 from the bottom of the tank for return to the heating chamber 11. The lift 43 and another lift 55, the function of which is later described, have the construction illustrated in FIG. 2. These lifts comprise an upper roller or pulley 44 and a lower roller or pulley 45, one of which is driven. An endless belt or series of side-by-side belts 46 is positioned about and driven by the rollers or pulleys 44,45 which rotate in the direction of the arrows shown in FIG. 1. A series of longitudinally elongated lifts 47 are mounted on the belt(s) 46. Each lift comprises an elongated bar 48 connected at one edge to the belt(s) 46 and bearing an elongated lip 49 at the other edge. Each bar and lip forms an elongated seat 50 for conveyance of the balls 16 (or rollers).

As shown in FIG. 1, the rinse tank 33 has a bottom wall 51 which is downwardly pitched in the direction toward the lift 43 extending along one edge of the rinse tank. As the ball lift operates within the tank, the rinsed balls 16 (or rollers) are picked up at the bottom of the tank 33 and lifted upwardly in the seats 50.

At the upper side of the roller or pulley 44, the balls (or rollers) fall out of the seats 50, e.g., the balls 16'. A resilient blade 52 (FIG. 2) projects into the path of the lifts 47. The balls 16 are pushed by the free edge of the blade 52 off the back side of the lifts onto the sheet 17 or 53 when the following lift 47 strikes the blade 52.

The ball return from the lift 43 of the rinse tank 33 to the head or entrant end 19 if the solar heating chamber 11 comprises a sloping or pitched ball (or roller) return sheet 53. The sheet 53 slopes downwardly from the rinse tank and its lift to a collector well 54. The balls 16 (or rollers) accumulated in the well are picked up by the lifts 47 of the lift 55, the structure of which is illustrated in FIG. 2. The balls or rollers are then lifted and discharged onto the sheet 17 at its entrant end 19 for another cycle as aforedescribed.

If desired, the vaporizing chamber 12 may be operated under partial vacuum. For this purpose, a vacuum tap 57 is provided in the top wall of the housing 39. A partial vacuum has the advantage of lowering the vaporizing temperature of the water sprayed onto the heated balls (or rollers) in the vaporizing chamber.

Figure 4:
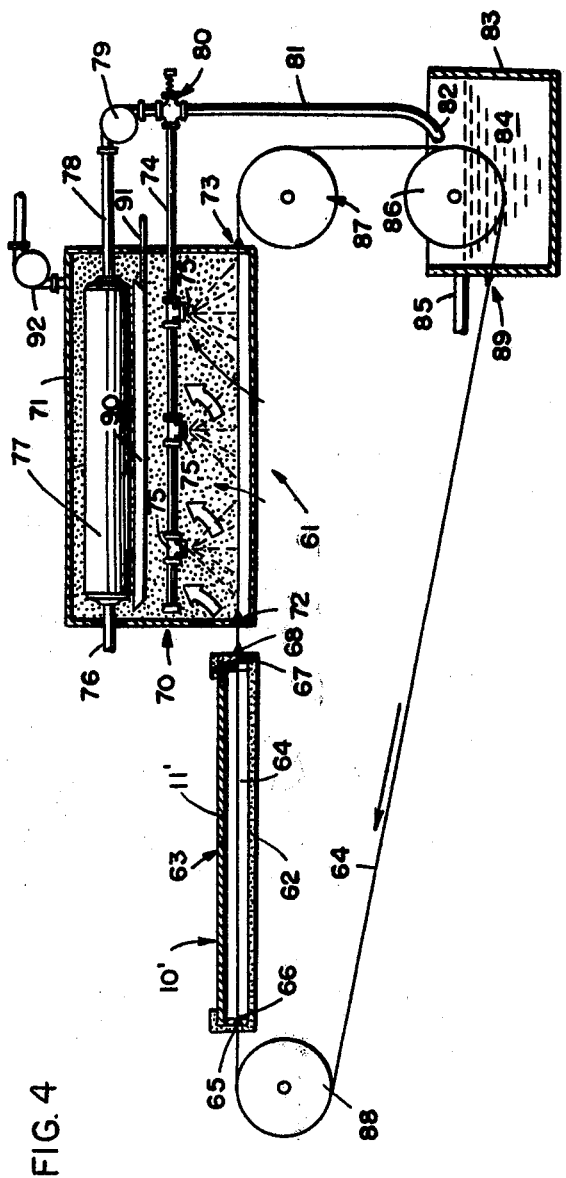
FIG. 4 is a vertical section of a second embodiment utilizing a metal endless belt as the solar-heated member.

Another embodiment of desalination apparatus 10' is illustrated in FIG. 4. In many respects this embodiment is like the embodiment of FIGS. 1-3. Here, however, the metal member, which is solar heated, is an endless metal band or belt. Referring to FIG. 4, the solar desalinator 61 comprises an insulated heating chamber 62 having a glass cover 63. An endless belt 64 (or a series of side-by-side endless belts) is made of flexible, heat conducting metal. Again aluminum is particularly suitable, particularly thin-rolled aluminum which is anoidzed black or other dark, heat-absorptive color.

The endless belt(s) 64 enters the solar heating chamber 62 through a horizontal slit 65. In passing through the heating chamber, it absorbs solar radiation and becomes heated. Preferably, the slit has a rubber seal or wiper 66 extending along its length. The endless belt(s) exits from the heating chamber 62 through another horizontal slit 67 also having a rubber seal or wiper 68.

The heated belt(s) immediately enter the vaporizing chamber 70. This chamber comprises a six-sided enclosure 71, the heated belt(s) entering the chamber 70 through the horizontal slot 72 with a wiper or seal as aforesaid. The belt(s) exits from the opposite side of the enclosure 71 through a similar horizontal slit 73 with a rubber wiper or seal as aforesaid.

Sea water or other salty or saline water is fed to the horizontal pipe 74 bearing axially spaced spray nozzles 75. The water is sprayed into the heated belt(s), causing the water to vaporize in the enclosure 71.

The sea, salty or saline water is supplied through the feed pipe 76. This water is relatively cool, e.g., at ambient temperature, and first flows through the condenser jacket and/or tubing 77, exiting from the opposite end via the pipe 78. At this stage, the water has a rise in temperature. A pump 79 may be provided at any point, e.g., at a point immediately before the pressure relief valve 80, which also serves as the tap off coupling for the pipes 74 and 81.

The pipe 81 extends downwardly from the pressure relief valve toward the belt(s) rinse tank 83. Its discharge end 82 may be in the form of a spray nozzle which directs spray directly against the belt(s) above the level of the rinse water 84 in the tank 83 to aid in loosening salt deposits which may have formed in the belt(s) in the vaporizing chamber 70.

The belt(s) is immersed in the rinse water 84, which is heated or warmed sea, salt or saline water, the level of which is maintained constant by the overflow pipe 85, from which the water is returned to its original source.

The belt(s) 64 travels over three drums or rollers 86, 87 and 88, one of which is driven. If the belt(s) exits from the rinse tank 63 below the level of the rinse water 84, this is conveniently done through a horizontal slit in the side wall of the tank 83, which slit is maintained relatively watertight by the rubber seal 89. The latter also serves as a wiper to remove all or most of the rinse water from the exiting belt(s).

As in the embodiment of FIGS. 1-3, the vaporizing chamber has a condensate-collector pan or trough 90 below the condenser 77 to collect condensed, essentially salt-free condensate formed on the cooled surfaces of the condenser. This water is withdrawn through the tap off pipe 91. The enclosure 71 may be operated under partial vacuum, e.g., by providing a vacuum pump 92 and appropriate piping on the upper wall of the enclosure 71.

The glass covers 13 and 63 preferably are made of special glass which maximizes transmission of both direct and diffuse sunlight and the heating of the metal member(s) therebeneath. An exemplary, suitable glass is "solarpane" glass marketed by Pittsburgh Plate Glass. Another type of special glass with lenses is described below.

In FIG. 5, a solar mirror system is illustrated diagramatically, which system is useful in maximizing transmission of solar radiation to the heating chamber 11 throughout the sunlight hours. A pivotable parabolic mirror 95 is pivoted to follow the path of the sun from 1 or 2 hours after dawn to 1 or 2 hours before dusk. The reflected rays from the mirror 95 are reflected by the planar mirror 96, which in turn is movable and/or pivotable to maintain its proper orientation with the pivotable parabolic mirror.

The mirror 96 is maintained at the approximate focus point of the mirror 95 and reflects the solar rays laterally to a spherical or cylindrical convexo-concave stationary mirror 97. The latter is positioned directly above the solar heating chamber 11 or 11' and reflects the solar rays downwardly over substantially the whole light transmitting portion of the heating chamber 11 or 11'. Such mirror arrangement allows the subject solar desalination apparati to be used during most of the daylight hours.

FIGS. 6 and 7 constitute a top plan view and a side elevation of a segment of the heating chamber 11 or 11'. The glass cover 13,63 is composed of rows of lenses 101, such rows being directly above and aligned with the tracks or grooves 18 in the sheet 17. These lenses focus the solar rays at approximately the upper most level 102 of the balls 16 (or at the plane of the endless metal belt 64 in the heating chamber 11'), this maximizing the concentration of solar heat in a manner similar to the focusing of a magnifying glass upon combustible material to ignite same. In a case of the heating of metal balls, the respective lenses 101 maximizes the application of solar radiation by positioning of their focal point directly above the tracks or grooves 18 whereby the solar radiation is applied along the rolling diameters of the respective balls as they pass through the heating chamber.

It is believed that the advantages and objectives of the invention will be appreciated from the foregoing description of the generic invention and its preferred embodiments. Other embodiments of the generic invention may be realized without departing from the scope of the invention described aforesaid and set forth in the dependent claims.

I claim:

1. Solar desalination apparatus comprising a heating chamber having a light permeable glass in its upper side, means to convey at least one solar heatable, endless metal belt through said chamber beneath said glass to subject said belt to solar radiation in said chamber and thereby heat said belt, a vaporizing chamber adjacent said heating chamber, means for passing the heated belt through said vaporizing chamber, means for applying saline water onto said heated belt in said vaporizing chamber to vaporize the water applied thereon, and condensing means to condense the essentially salt-free vapors so produced.

2. A desalintion apparatus as claimed in claim 1, a rinse tank, means for supplying rinse water to said tank, means to convey said belt from said vaporizing chamber into the rinse water in said tank, and furher means to convey the rinsed belt back to said heating chamber.

3. Soar desalination apparatus as claimed in claim 2 wherein said condensing means embodies means for circulation of saline water through the condenser means, whereby said saline water becomes warmer as it passes through said condensing means, end pipe means to feed the warmer saline water from said condensing means to said rinse tank whereby said warmer saline water serves as the supplied rinse water.

4. Solar desalination apparatus as claimed in claim 1 wherein said endless belt comprises an aluminum metal belt anodized in a dark, heat-absorbing color.

5. A desalination apparatus as claimed in claim 1, a rinse tank, means for supplying rinse water to said tank, means to convey said belt from said vaporizing chamber into the rinse water in said tank, and further means to convey the rinsed belt back to said heating chamber via a spray nozzle which directs spray of the warm saline water directly against the belt to aid in loosening salt deposits which may have formed on the belt.

6. Solar desalination apparatus as claimed in claim 1 wherein said glass is composed of a plurality of lenses which focus solar rays in the plane of the metal belt as it passes through said heating chamber.

* * * * *